US012785206B2

(12) United States Patent
Hwang et al.

(10) Patent No.: US 12,785,206 B2
(45) Date of Patent: Nov. 3, 2026

(54) SECONDARY BATTERY

(71) Applicant: LG Energy Solution, Ltd., Seoul (KR)

(72) Inventors: Soo-Ji Hwang, Daejeon (KR); Sang-Hun Kim, Daejeon (KR); Min-Hyeong Kang, Daejeon (KR); Dae-Woong Song, Daejeon (KR); Hyung-Kyun Yu, Daejeon (KR); Hun-Hee Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 812 days.

(21) Appl. No.: 18/029,850

(22) PCT Filed: Apr. 15, 2022

(86) PCT No.: PCT/KR2022/005496
§ 371 (c)(1),
(2) Date: Mar. 31, 2023

(87) PCT Pub. No.: WO2022/220651
PCT Pub. Date: Oct. 20, 2022

(65) Prior Publication Data

US 2023/0369710 A1 Nov. 16, 2023

(30) Foreign Application Priority Data

Apr. 15, 2021 (KR) ........................ 10-2021-0049379

(51) Int. Cl.
*H01M 50/105* (2021.01)
*H01M 50/193* (2021.01)
*H01M 50/342* (2021.01)

(52) U.S. Cl.
CPC ..... *H01M 50/3425* (2021.01); *H01M 50/105* (2021.01); *H01M 50/193* (2021.01)

(58) Field of Classification Search
CPC .. H01M 50/34; H01M 50/3425; H01M 50/50; H01M 50/105; H01M 50/193
See application file for complete search history.

(56) References Cited

U.S. PATENT DOCUMENTS

2003/0148173 A1 † 8/2003 Gu
2007/0072069 A1 * 3/2007 Yamada ................. B01D 69/12
428/515

(Continued)

FOREIGN PATENT DOCUMENTS

CN 1437273 A 8/2003
CN 106042566 A 10/2016

(Continued)

OTHER PUBLICATIONS

Machine Translation of: Sonozaki et al. (JP 2001-383800 A), Oct. 12, 2001.*

(Continued)

*Primary Examiner* — Kenneth J Douyette
(74) *Attorney, Agent, or Firm* — Lerner David LLP

(57) ABSTRACT

Disclosed herein is a secondary battery, which includes an electrode assembly; an electrode lead attached to the electrode assembly; a case configured to accommodate the electrode assembly therein; a lead film formed to surround a part of an outer surface of the electrode lead and interposed between the electrode lead and the case; a vent region formed in at least a part of the case; and a vent member inserted into the vent region and having a structure of three or more layers, wherein the vent member contains a linear low-density polyethylene having a comonomer with a carbon number of 6 or more in outermost layers and contains a resin having a higher melting point than the linear low-density polyethylene having a comonomer with a carbon number of 6 or more in a middle layer.

20 Claims, 4 Drawing Sheets

(56) References Cited

U.S. PATENT DOCUMENTS

| | | | | |
|---|---|---|---|---|
| 2009/0186280 | A1* | 7/2009 | Iidani | H01M 50/417 428/338 |
| 2009/0274955 | A1† | 11/2009 | Kikuchi | |
| 2011/0104468 | A1 | 5/2011 | Rhee et al. | |
| 2012/0053308 | A1 | 3/2012 | Garroff et al. | |
| 2014/0080011 | A1* | 3/2014 | Kim | G01N 27/4075 429/529 |
| 2014/0159271 | A1* | 6/2014 | Itou | B29C 48/914 264/48 |
| 2015/0333300 | A1* | 11/2015 | Kim | H01M 50/591 429/82 |
| 2018/0294459 | A1 | 10/2018 | Yamada et al. | |
| 2023/0369710 | A1 | 11/2023 | Hwang et al. | |
| 2024/0145857 | A1 | 5/2024 | Hayashi et al. | |

FOREIGN PATENT DOCUMENTS

| | | | | |
|---|---|---|---|---|
| CN | 108025539 | A | | 5/2018 |
| JP | H09207294 | A | | 8/1997 |
| JP | 2001072788 | A | † | 3/2001 |
| JP | 2001093489 | A | | 4/2001 |
| JP | 2001229904 | A | | 8/2001 |
| JP | 2001273884 | A | † | 10/2001 |
| JP | 2001283800 | A | † | 10/2001 |
| JP | 2002-245988 | A | | 8/2002 |
| JP | 2003-123710 | A | | 4/2003 |
| JP | 2003242952 | A | | 8/2003 |
| JP | 2005116474 | A | | 4/2005 |
| JP | 2007-115678 | A | | 5/2007 |
| JP | 2010086753 | A | | 4/2010 |
| JP | 2017062872 | A | | 3/2017 |
| JP | 2018053180 | A | | 4/2018 |
| JP | 2019142018 | A | † | 8/2019 |
| JP | 2023536670 | A | | 8/2023 |
| KR | 20030066895 | A | | 8/2003 |
| KR | 20080028444 | A | | 3/2008 |
| KR | 20110131259 | A | | 12/2011 |
| KR | 20140032701 | A | | 3/2014 |
| KR | 101452945 | B1 | | 10/2014 |
| KR | 20150055775 | A | | 5/2015 |
| KR | 101653305 | B1 | | 9/2016 |
| KR | 20170007876 | A | | 1/2017 |
| KR | 101722408 | B1 | | 4/2017 |
| KR | 20190126617 | A | | 11/2019 |
| KR | 102159368 | B1 | | 9/2020 |
| KR | 20200139654 | A | | 12/2020 |
| KR | 20210049379 | A | | 5/2021 |
| WO | 2007010878 | A1 | | 1/2007 |
| WO | 2021201213 | A1 | | 10/2021 |

OTHER PUBLICATIONS

Machine Translation of: Takita et al. (JP 2001-072788 A), Mar. 21, 2001.*

Search report from International Application No. PCT/KR2022/005496, mailed Jul. 25, 2022.

Search Report dated Aug. 28, 2025 from the Office Action for Chinese Application No. 202280006160.X issued Sep. 2, 2025, pp. 1-3.

Merit 1 : Ube-Maruzen Polyethylene (https://www.ube.co.jp/ump/products/property_umerit.html) published 2010.

Merit 2 : Sumitomo Chemical (https://www.sumitomo-chem.co.jp/polyolefin/03product/pdf/03sumikathene_e.pdf) published Jul. 2020.

Yi Ren et al., Different Dependence of Tear Strength on Film Orientation of LLDPE Made with Different Co-Monomer, Published: Mar. 6, 2019, Polymers 2019, 11, 434, pp. 1-13.

* cited by examiner
† cited by third party

SECONDARY BATTERY

CROSS-REFERENCE TO RELATED APPLICATIONS

The present application is a national phase entry under 35 U.S.C. § 371 of International Application No. PCT/KR2022/005496 filed on Apr. 15, 2022, which claims priority from Korean Patent Application No. 10-2021-0049379 filed on Apr. 15, 2021, all of which are incorporated herein by reference.

TECHNICAL FIELD

The present disclosure relates to a secondary battery, and more particularly, to a secondary battery having a vent member.

BACKGROUND ART

Secondary batteries are highly applicable to various products and exhibit superior electrical properties such as high energy density, etc. Secondary batteries are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like.

The secondary battery generally has a structure in which an electrode assembly including at least one unit cell having a positive electrode/separator/negative electrode structure is accommodated in a case of a laminate sheet in which an outer layer, a metal barrier layer and a sealant layer are sequentially laminated, and a sealant resin of the sealant layer is fused to seal the electrode assembly is sealed.

In the conventional secondary battery, the battery may ignite due to various causes such as a short circuit inside the secondary battery, overcharge or overdischarge, temperature control, or the like. At this time, thermal propagation where the temperature inside the secondary battery rises rapidly and simultaneously the heat is transferred to neighboring cells may be generated, which may further increase the fire.

In order to minimize damage to the electrode caused by gas when thermal propagation occurs—i.e., when the internal temperature of the secondary battery rises, directional venting characteristic is required to discharge the gas in one direction. However, the conventional secondary battery has a problem in that it is difficult to induce gas discharge in a specific direction.

Therefore, the present disclosure is directed to providing a secondary battery with improved safety by inducing gas discharge in a specific direction.

DISCLOSURE

Technical Problem

The present disclosure is directed to providing a secondary battery with improved safety by inducing gas discharge in a specific direction.

Technical Solution

In one aspect of the present disclosure, there are provided secondary batteries according to the following embodiments.

The first embodiment provides a secondary battery, comprising:

an electrode assembly;

an electrode lead attached to the electrode assembly;

a case configured to accommodate the electrode assembly therein;

a lead film formed to surround a part of an outer surface of the electrode lead and interposed between the electrode lead and the case;

a vent region formed in at least a part of the case; and a vent member inserted into the vent region and having a structure of three or more layers, wherein the vent member contains a linear low-density polyethylene having a comonomer with a carbon number of 6 or more in outermost layers and contains a resin having a higher melting point than the linear low-density polyethylene having a comonomer with a carbon number of 6 or more in a middle layer.

In the second embodiment according to the first embodiment, a vent may occur between the case and the outermost layer.

In the third embodiment according to the first embodiment or the second embodiment, the resin having a higher melting point than the linear low-density polyethylene having a comonomer with a carbon number of 6 or more may have a melting point of higher than 120° C. and 140° C. or below.

In the fourth embodiment according to any one of the first to third embodiments, the linear low-density polyethylene having a comonomer with a carbon number of 6 or more may have a melting point of 100° C. to 120° C.

In the fifth embodiment according to any one of the first to fourth embodiments, the resin having a higher melting point than the linear low-density polyethylene having a comonomer with a carbon number of 6 or more may include a high-density polyethylene, random polypropylene, or a mixture thereof.

In the sixth embodiment according to any one of the first to fifth embodiments, the case may include a sealing portion formed to seal the electrode assembly, the sealing portion may contain a sealant resin, and the linear low-density polyethylene of the vent member having a comonomer with a carbon number of 6 or more may have a lower melting point than the sealant resin.

In the seventh embodiment according to any one of the first to sixth embodiments, the outermost layer may contain a linear low-density polyethylene having a comonomer with a carbon number of 6 to 8.

In the eighth embodiment according to any one of the first to seventh embodiments, the vent member may melt at 100° C. to 120° C. to vent a gas.

In the ninth embodiment according to the eighth embodiment, the vent member may be vented at a pressure of 1.5 atm or above.

In the tenth embodiment according to any one of the first to ninth embodiments, the vent member may have a maximum sealing strength of less than 6 kgf/15 mm at 100° C. or above.

In the eleventh embodiment according to any one of the first to tenth embodiments, the vent member may have an average sealing strength of less than 4.5 kgf/15 mm at 100° C. or above.

In the twelfth embodiment according to any one of the first to eleventh embodiments, the vent member may have a maximum sealing strength of 6 kgf/15 mm or more at room temperature to 60° C.

In the thirteenth embodiment according to any one of the first to twelfth embodiments, the vent member may have an average sealing strength of 4.5 kgf/15 mm or more at room temperature to 60° C.

In the fourteenth embodiment according to any one of the first to thirteenth embodiments, the linear low-density polyethylene having a comonomer with a carbon number of 6 or more may be polymerized in the presence of a metallocene catalyst.

In the fifteenth embodiment according to any one of the first to fourteenth embodiments, in the linear low-density polyethylene having a comonomer with a carbon number of 6 or more, a content of the comonomer with a carbon number of 6 or more may be 15 weight % or less, based on 100 weight % of the linear low-density polyethylene having a comonomer with a carbon number of 6 or more.

In the sixteenth embodiment according to any one of the first to fifteenth embodiments, the linear low-density polyethylene having a comonomer with a carbon number of 6 or more may have a poly dispersity index (PDI) of 4 or less.

In the seventeenth embodiment according to any one of the sixth to sixteenth embodiments, a difference between a crystallization temperature of the sealant resin and a crystallization temperature of the linear low-density polyethylene having a comonomer with a carbon number of 6 or more may be 10° C. or less.

In the eighteenth embodiment according to the seventeenth embodiment, the linear low-density polyethylene having a comonomer with a carbon number of 6 or more may have a crystallization temperature of 90° C. to 115° C.

In the nineteenth embodiment according to any one of the first to eighteenth embodiments, the linear low-density polyethylene having a comonomer with a carbon number of 6 or more may have a weight-average molecular weight of 100,000 g/mol to 400,000 g/mol.

In the twentieth embodiment according to any one of the fourth to nineteenth embodiments, the vent region may be located in the sealing portion.

In the twenty first embodiment according to the twentieth embodiment, the vent region may be located in the sealing portion at a corner of the case.

In the twenty second embodiment according to any one of the first to twenty first embodiments, the secondary battery may be a pouch-type secondary battery.

Advantageous Effects

The secondary battery according to an embodiment of the present disclosure includes a vent member, which has a structure of three or more layers, contains a linear low-density polyethylene having a comonomer with a carbon number of 6 or more in the outermost layers and contains a resin having a higher melting point than the linear low-density polyethylene having a comonomer with a carbon number of 6 or more, so it is possible to induce gas to be discharged to the vent region and improve the rigidity of the vent member, thereby preventing early venting prior to a desired temperature and pressure. Accordingly, the safety of the battery is improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A secondary battery according to an embodiment of the present disclosure includes an electrode assembly; an electrode lead attached to the electrode assembly; a case configured to accommodate the electrode assembly therein; a lead film formed to surround a part of an outer surface of the electrode lead and interposed between the electrode lead and the case; a vent region formed in at least a part of the case; and a vent member inserted into the vent region and having a structure of three or more layers, wherein the vent member contains a linear low-density polyethylene having a comonomer with a carbon number of 6 or more in outermost layers and contains a resin having a higher melting point than the linear low-density polyethylene having a comonomer with a carbon number of 6 or more.

Figure 1:
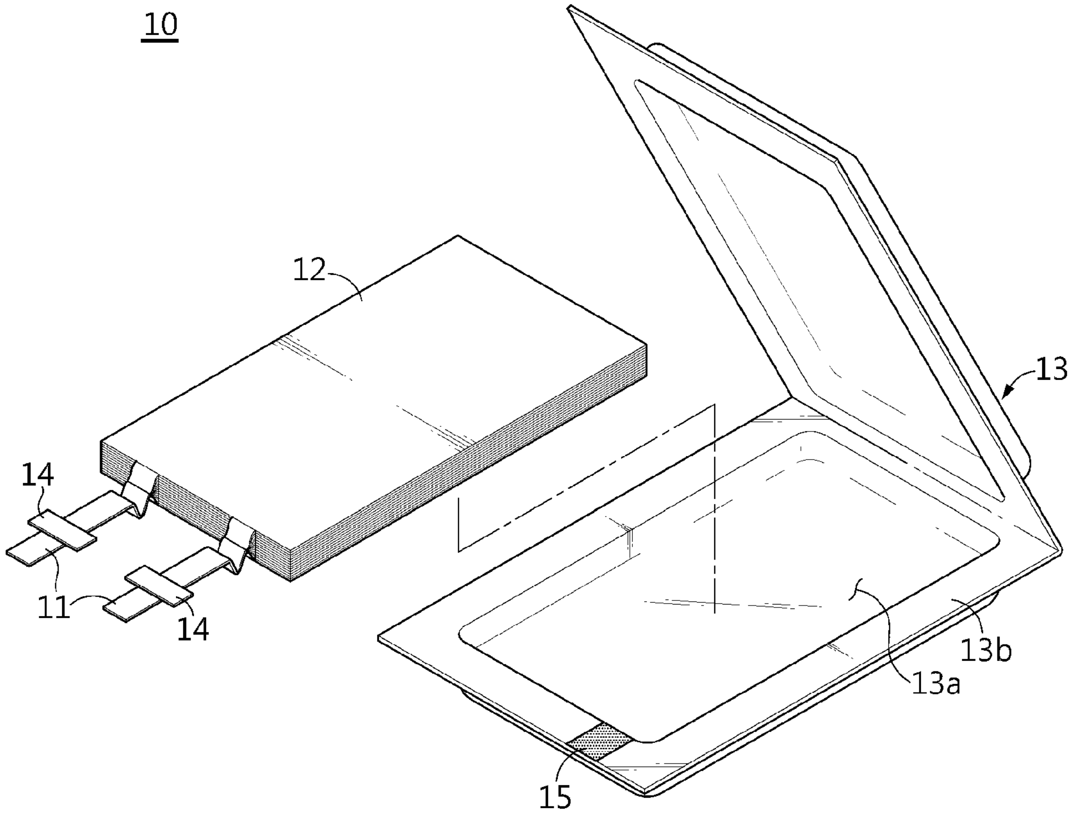
FIG. 1 is an exploded perspective view of a secondary battery according to an embodiment of the present disclosure.
Figure 2:
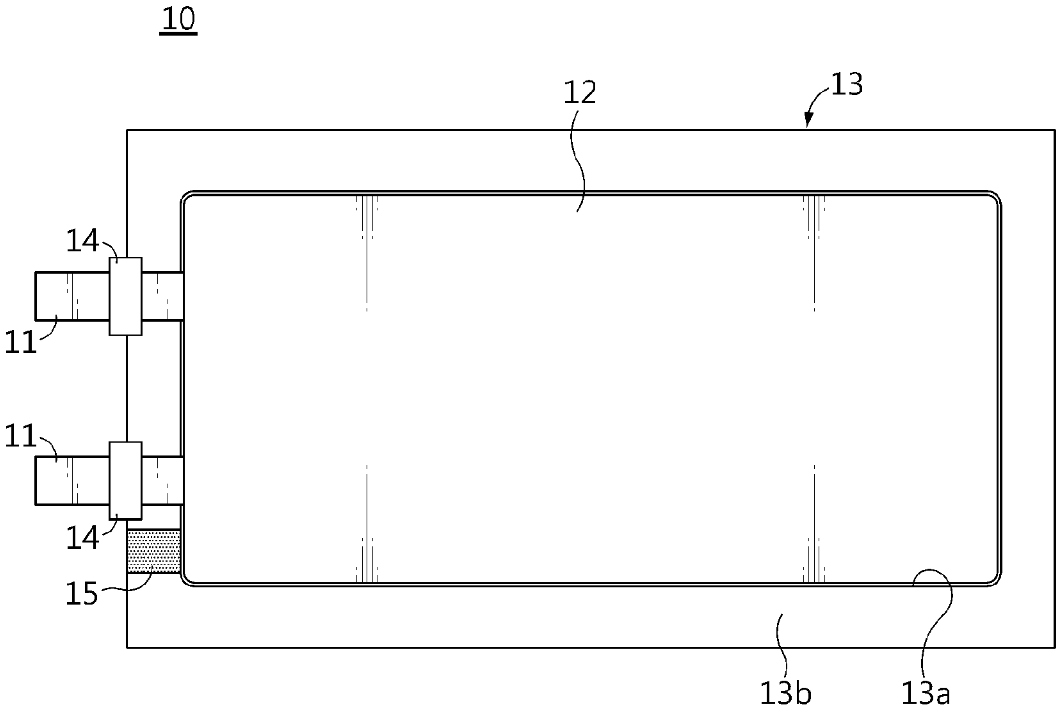
FIG. 2 is a plan view of the secondary battery according to an embodiment of the present disclosure.

FIGS. 1 and 2 show a secondary battery 10 according to an embodiment of the present disclosure.

Referring to FIGS. 1 and 2, the secondary battery 10 includes an electrode assembly 12 to which an electrode lead 11 is attached, and a case 13.

The electrode assembly 12 includes a positive electrode plate, a negative electrode plate and a separator. In the electrode assembly 12, a positive electrode plate and a negative electrode plate may be sequentially laminated with a separator being interposed therebetween.

The positive electrode plate may include a positive electrode current collector made of a metal thin film having excellent conductivity—for example, an aluminum (Al) foil, and a positive electrode active material layer coated on at least one surface thereof. In addition, the positive electrode plate may include a positive electrode tab made of a metal material—for example, an aluminum (Al) material, at one side end thereof. The positive electrode tab may protrude from one side end of the positive electrode plate. The positive electrode tab may be welded to one side end of the positive electrode plate, or be bonded thereto using a conductive adhesive.

The negative electrode plate may include a negative electrode current collector made of a conductive metal thin film—for example, a copper (Cu) foil, and a negative electrode active material layer coated on at least one surface thereof. In addition, the negative electrode plate may include a negative electrode tab formed of a metal material—for example, a nickel (Ni) material, at one side end thereof. The negative electrode tab may protrude from one side end of the negative electrode plate. The negative electrode tab may be welded to one side end of the negative electrode plate, or be bonded thereto using a conductive adhesive.

The separator is interposed between the positive electrode plate and the negative electrode plate to electrically insulate the positive electrode plate and the negative electrode plate from each other. The separator may be a porous membrane so that lithium ions can pass between the positive electrode plate and the negative electrode plate. The separator may include, for example, a porous membrane using polyethylene (PE), or polypropylene (PP), or a composite film thereof.

An inorganic coating layer may be provided on the surface of the separator. The inorganic coating layer may have a structure in which inorganic particles are bonded to each other by a binder to form an interstitial volume between the particles.

The electrode assembly 12 may be a jelly-roll (winding-type) electrode assembly having a structure in which long sheet-type positive and negative electrodes are wound with a separator being interposed therebetween, a stacked (stack-type) electrode assembly having a structure in which a plurality of positive and negative electrodes cut into units of a predetermined size are sequentially stacked with a separator being interposed therebetween, a stack/folding type electrode assembly having a structure in which bi-cells or full-cells where positive and negative electrodes of a predetermined unit are stacked with a separator being interposed therebetween are wound, or the like.

The case 13 serves to accommodate the electrode assembly 12.

In an embodiment of the present disclosure, the case 13 may include an accommodation portion **13*a* for accommodating the electrode assembly 12, and a sealing portion 13*b* formed to seal the electrode assembly 12 as shown in FIG. 1**.

The sealing portion **13*b* may include a sealant resin, and the sealant resin may be fused along an outer circumference of the accommodation portion 13*a* to seal the electrode assembly 12**.

In an embodiment of the present disclosure, the case 13 may be provided in a film form having a multilayer structure including an outer layer for protection against external impacts, a metal barrier layer for blocking moisture, and a sealant layer for sealing the case.

The outer layer may include a polyester-based film using polyethylene terephthalate (PET), polybutylene terephthalate, polyethylene naphthalate, polybutylene naphthalate, co-polyester, polycarbonate, nylon, or the like, and may be configured in a single layer or multiple layers.

The metal barrier layer may include aluminum, copper, or the like.

The sealant layer may include a sealant resin and may be formed in a single layer or multiple layers.

The sealant resin may include polypropylene (PP), acid-modified polypropylene (PPa), random polypropylene, ethylene propylene copolymer, or two or more thereof. The ethylene propylene copolymer may include, but is not limited to, ethylene-propylene rubber, ethylene-propylene block copolymer, and the like.

In an embodiment of the present disclosure, the case 13 may be in a pouch form.

The pouch-type case 13 may include an upper pouch and a lower pouch. When the case 13 includes an upper pouch and a lower pouch, after the upper pouch and the lower pouch are positioned so that the sealant resins thereof face each other, the facing sealant resins may be configured to be fused with each other by heat and pressure to seal the battery.

The fusion of the sealing portion **13*b* may be thermal fusion, ultrasonic fusion, or the like, but is not particularly limited as long as the sealing portion 13*b*** can be fused.

The sealing portion **13*b* may be sealed on four or three peripheral sides of the battery case 13 in some embodiments. In the three-sided sealing structure, after the upper pouch and the lower pouch are formed on one pouch sheet, the boundary surface between the upper pouch and the lower pouch is bent so that the electrode assembly accommodation portions 13*a*** formed on the upper pouch and the lower pouch overlap, and in this state, the edges of the remaining three sides are sealed except for the bending portion.

The electrode lead 11 may be accommodated in the case 13 so that a part thereof is exposed to the outside of the battery case 13 as shown in FIG. 1.

The secondary battery 10 according to an embodiment of the present disclosure includes a lead film 14.

The lead film 14 surrounds a part of the outer surface of the electrode lead 11 and is interposed between the electrode lead 11 and the case 13. For example, the lead film 14 may be interposed between the electrode lead 11 and the sealing portion **13*b* of the case 13 in a region where the electrode lead 11 protrudes or extends away from the case 13 to help binding of the electrode lead 11 and the case 13**.

Referring to FIGS. 1 and 2, the secondary battery 10 according to an embodiment of the present disclosure may include a vent region (not shown) formed in at least a part of the case 13, and the vent member 15 may be inserted into the vent region. When thermal propagation occurs, the vent member 15 may induce gases to be discharged in a specific direction, thereby improving the safety of the battery.

The vent member 15 may be attached to the case 13 by thermal fusion. In another example, the vent member 15 may be attached to the case 13 by an adhesive such as glue. In another example, the vent member 15 and the case 13 may be physically coupled to each other by means of a clip or the like. In another example, at least a part of the vent member 15 may be embedded in a film constituting the case 13, for example a sealant resin.

The vent member 15 has a structure of three or more layers. The vent member 15 contains a linear low-density polyethylene having a comonomer of carbon number 6 or more in outermost layers **15*a*, and contains a resin having a higher melting point than the linear low-density polyethylene having a comonomer with a carbon number of 6 or more in a middle layer 15*b***.

As the vent member 15 contains the linear low-density polyethylene having a comonomer with a carbon number of 6 or more, the sealing property of the case 13 is excellent in the normal temperature range, for example at room temperature to 60° C., and at a high temperature, for example as at 100° C. or above, the vent sealing strength of the case in which the vent member 15 is inserted may be lowered, which may realize or cause venting.

However, when only linear low-density polyethylene having a comonomer with a carbon number of 6 or more is included, the linear low-density polyethylene having a comonomer with a carbon number of 6 or more lacks rigidity, and thus, when internal pressure of the battery increases, early venting may occur at a condition prior to the desired temperature and pressure.

The resin having a higher melting point than the linear low-density polyethylene having a comonomer with a carbon number of 6 or more contributes to maintaining the mechanical rigidity of the vent member 15. Since the rigidity of the vent member 15 is improved, vent characteristics may be realized at high temperatures, and it is possible to prevent early venting from occurring prior to the desired temperature and pressure.

Figure 3:
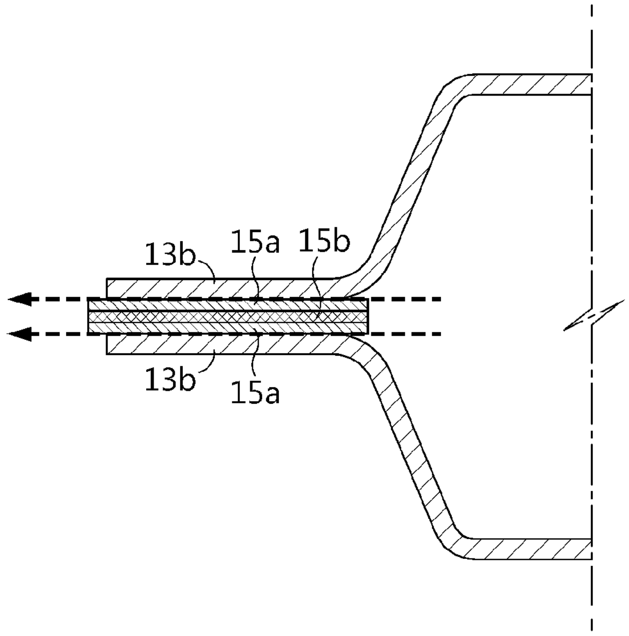
FIG. 3 is a diagram showing a state in which a vent occurs in the secondary battery according to an embodiment of the present disclosure.

FIG. 3 is a diagram showing a state in which a vent occurs in the secondary battery according to an embodiment of the present disclosure. Specifically, FIG. 3 is a cross-sectional view showing the vent member in the secondary battery according to an embodiment of the present invention.

Referring to FIG. 3, at a temperature at which the battery normally operates, the vent member 15 serves to seal the case from the outside. If the temperature of the battery rises excessively due to abnormal operation of the battery, the vent member 15 melts and the sealing strength of the part of the vent member 15 in which the vent member 15 is inserted decreases. Therefore, gas may be discharged into this part. For example, as the pressure of the gas inside the battery is applied to the interface between the vent member 15 and the case, a gap is formed between the vent member 15 and the case, and the gas may be discharged thereto.

For example, as shown in FIG. 3, a vent may occur between the case and the outermost layer 15*a*. If the battery temperature rises excessively due to abnormal operation of the battery, the linear low-density polyethylene having a comonomer with a carbon number of 6 or more melts, and the sealing strength of the part in which the vent member is inserted decreases. Accordingly, venting may occur between the case 13 and the outermost layer 15*a*.

In an embodiment of the present disclosure, the vent member 15 may be manufactured by inserting the resin having a higher melting point than the linear low-density polyethylene having a comonomer with a carbon number of 6 or more between the linear low-density polyethylenes having a comonomer with a carbon number 6 or more, and then fusing the resin. For example, the resin having a higher melting point than the linear low-density polyethylene having a comonomer with a carbon number of 6 or more may be thermally fused between the linear low-density polyethylenes having a comonomer with a carbon number of 6 or more. In another example, the resin may be fused through an adhesive such as glue.

In an embodiment of the present disclosure, the vent member 15 may be vented at 100° C. to 120° C. to expel or exhaust gases from the accommodation portion to outside the secondary battery. In particular, the vent member 15 may be vented at a pressure of 100° C. to 120° C. and at a pressure of 1.5 atm or more. As the vent member 15 is vented in the aforementioned temperature range and/or the aforementioned pressure condition, it is possible to induce the gas to be discharged only during abnormal operation of the battery while allowing sealing of the battery during normal operation of the battery.

In an embodiment of the present disclosure, the vent member 15 may have a maximum sealing strength of less than 6 kgf/15 mm or less than 5 kgf/15 mm or less than 4.5 kgf/15 mm at 100° C. or higher. In an embodiment of the present disclosure, the vent member 15 may have a maximum sealing strength of less than 6 kgf/15 mm or less than 5 kgf/15 mm or less than 4.5 kgf/15 mm at 100° C. to 120° C. In an embodiment of the present disclosure, the vent member 15 may have a maximum sealing strength of less than 3 kgf/15 mm or less than 2 kgf/15 mm or less than 1 kgf/15 mm or less than 0.5 kgf/15 mm at 120° C. or higher. If the vent member 15 satisfies the above-mentioned sealing strength in the above-mentioned temperature range, the sealing strength of the part of the case 13 in which the vent member 15 is inserted may be lowered at a high temperature, for example 100° C. or higher, so that the vent characteristic may be readily implemented.

In addition, in an embodiment of the present disclosure, the vent member 15 may have a maximum sealing strength of 6 kgf/15 mm or more or 8 kgf/15 mm or more or 10 kgf/15 mm or more or 13 kgf/15 mm or more at room temperature to 60° C. If the vent member 15 satisfies the above-mentioned sealing strength in the above temperature range, even though the vent member 15 is inserted, the part of the case 13 in which the vent member 15 is inserted may have excellent sealing strength during normal operation of the battery, which may easily secure the sealing property of the battery. In addition, the maximum sealing strength at room temperature to 60° C. may be further improved, compared to the case where the vent member 15 includes only the linear low-density polyethylene having a comonomer with a carbon number of 6 or more. Accordingly, the rigidity of the vent member 15 may be improved, and thus early venting prior to a desired temperature and pressure may be prevented more easily.

In an embodiment of the present disclosure, the vent member 15 may have a maximum sealing strength of less than 6 kgf/15 mm at 100° C. or higher. The vent member 15 may have a maximum sealing strength of 6 kgf/15 mm or more at room temperature to 60° C. If the vent member 15 satisfies the sealing strength described above, the sealing strength of the part of the case 13 in which the vent member 15 is inserted may be lowered at a high temperature, for example at 100° C. or higher, so that the vent characteristic may be readily implemented. In addition, since the case 13 has excellent sealing strength during normal operation of the battery, the sealing property of the battery may be easily secured.

In an embodiment of the present disclosure, the vent member 15 may have an average sealing strength of less than 4.5 kgf/15 mm or less than 3 kgf/15 mm at 100° C. or above. In an embodiment of the present disclosure, the vent member 15 may have an average sealing strength of less than 4.5 kgf/15 mm or less than 3 kgf/15 mm at 100° C. to 120° C. In an embodiment of the present disclosure, the vent member 15 may have an average sealing strength of less than 2 kgf/15 mm or less than 1 kgf/15 mm or less than 0.5 kgf/15 mm at 120° C. or higher. If the vent member 15 satisfies the above-mentioned sealing strength in the above-mentioned temperature range, the sealing strength of the part of the case 13 in which the vent member 15 is inserted may be lowered at a high temperature, for example at 100° C. or higher, so that the vent characteristic may be implemented more easily.

In an embodiment of the present disclosure, the vent member 15 may have an average sealing strength of 4.5 kgf/15 mm or more or 5 kgf/15 mm or more or 6 kgf/15 mm or more or 7 kgf/15 mm or more or 8 kgf/15 mm or more at room temperature to 60° C. If the vent member 15 satisfies the above-mentioned sealing strength in the above temperature range, even though the vent member 15 is inserted, the part of the case 13 in which the vent member 15 is inserted may have excellent sealing strength during normal operation of the battery, thereby easily securing the sealing property. In addition, the average sealing strength at room temperature to 60° C. may be further improved, compared to the case where the vent member 15 includes only the linear low-density polyethylene having a comonomer with a carbon number of 6 or more. Accordingly, the rigidity of the vent member 15 may be improved, and thus early venting prior to a desired temperature and pressure may be prevented more easily.

In an embodiment of the present disclosure, the vent member 15 may have an average sealing strength of less than 4.5 kgf/15 mm at 100° C. or above. The vent member 15 may have an average sealing strength of 4.5 kgf/15 mm or more at room temperature to 60° C. If the vent member 15 has the above-mentioned sealing strength in the above-described temperature range, the sealing strength of the part of the case 13 in which the vent member 15 is inserted may be lowered at a high temperature, for example at 100° C. or higher, so that the vent characteristic may be easily implemented. In addition, since excellent sealing strength may be secured during normal operation of the battery, the sealing property of the battery may be easily secured.

The sealing strength of the vent member 15 according to temperature may be measured by conducting a tensile test at a speed of 5 mm/min, after cutting the part of the case in which the vent member 15 is inserted into a width of 15 mm and a length of 5 cm and then gripping both ends thereof using a UTM jig in a state where both ends are spread to 180°.

At this time, the maximum sealing strength means a maximum value when the case 13 is broken, and the average sealing strength means an average value when the case 13 is stretched by 8 mm at 4.5 kgf/15 mm when the maximum sealing strength is 4.5 kgf/15 mm or more and an average value when the case 13 is stretched by 8 mm at the maximum sealing strength when the maximum sealing strength is less than 4.5 kgf/15 mm.

In an embodiment of the present disclosure, the outermost layer 15*a* of the vent member 15 may contain a linear low-density polyethylene having a comonomer with a carbon number of 6 to 8.

In an embodiment of the present disclosure, the linear low-density polyethylene having a comonomer with a carbon number of 6 or more may have a lower melting point than the sealant resin. If the linear low-density polyethylene having a comonomer with a carbon number of 6 or more has a lower melting point than the sealant resin, the linear low-density polyethylene may melt faster than the sealant resin at high temperatures. Accordingly, as the sealing strength of the part in which the vent member 15 is inserted is lowered below the sealing strength of the part of the case containing the sealant resin, the vent characteristics may be more easily realized. In particular, venting may occur more easily between the case 13 and the outermost layer 15*a*.

In an embodiment of the present disclosure, the linear low-density polyethylene having a comonomer with a carbon number of 6 or more may have a melting point of 100° C. to 120° C., or 105° C. to 120° C., or 110° C. to 120° C. If the melting point of the linear low-density polyethylene having a comonomer with a carbon number of 6 or more satisfies the above-mentioned range, the sealing strength of the part of the case in which the vent member 15 is inserted may be lowered at a high temperature, for example 100° C. or higher, so that the venting characteristic may be more easily implemented. In particular, venting may occur more easily between the case 13 and the outermost layer 15*a*.

The melting point of the linear low-density polyethylene having a comonomer with a carbon number of 6 or more may be measured using a differential scanning calorimeter (DSC). For example, the temperature of a sample is increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the melting point may be measured by maintaining the temperature at 280° C. for 10 minutes.

In an embodiment of the present disclosure, the linear low-density polyethylene having a comonomer with a carbon number of 6 or more may be polymerized in the presence of a metallocene catalyst. If the linear low-density polyethylene having a comonomer with a carbon number of 6 or more is polymerized in the presence of a metallocene catalyst, it may be more advantageous in terms of sealing strength and properties, compared to the case where it is polymerized in the presence of a Ziegler-Natta catalyst.

In an embodiment of the present disclosure, the content of the comonomer with a carbon number of 6 or more in the linear low-density polyethylene having a comonomer with a carbon number of 6 or more may be 15 weight % or less, or 12 weight % or less, or 11.8 weight % or less, or 10 weight % or less, or 9 weight % or less, or 8 weight % or less, or 7.6 weight % or less, based on 100 weight % of the linear low-density polyethylene having a comonomer with a carbon number of 6 or more. At the same time, it may be 5 weight % or more, or 7.6 weight % or more, or 8 weight % or more, or 9.0 weight % or more, or 10 weight % or more, or 11.8 weight % or more, or 12 weight % or more. If the content of the comonomer with a carbon number of 6 or more satisfies the above-mentioned range, it may be easy to ensure that the sealing strength is not lowered during normal operation of the battery due to a decreased packing density between molecules.

The content of the comonomer with a carbon number of 6 or more may be measured using an H-NMR. For example, after about 10 mg of a sample is completely dissolved in about 0.6 mL of trichloroethylene solvent using a heat gun, it may be sampled in an NMR tube and measured using the $^{1}$H-NMR.

In an embodiment of the present disclosure, the linear low-density polyethylene having a comonomer with a carbon number of 6 or more may have a weight-average molecular weight of 100,000 g/mol to 400,000 g/mol, or 200,000 g/mol to 350,000 g/mol, or 230,000 g/mol to 300,000 g/mol. If the weight-average molecular weight of the linear low-density polyethylene having a comonomer with a carbon number of 6 or more satisfies the above-described range, the sealing strength with the sealant resin may be improved during normal operation of the battery.

In an embodiment of the present disclosure, the linear low-density polyethylene having a comonomer with a carbon number of 6 or more may have a poly dispersity index (PDI) of 4 or less, or 3.8 or less, or 3.796 or less, or 3.5 or less, or 3.023 or less, or 3 or less, or 2.7 or less, or 2.674 or less. In addition, the poly dispersity index (PDI) may be 1.0 or more. If the poly dispersity index of the linear low-density polyethylene having a comonomer with a carbon number of 6 or more satisfies the above range, the molecular weight distribution is narrow, so the sealing strength and the properties may be more excellent during normal operation of the battery.

The weight-average molecular weight and the poly dispersity index of the linear low-density polyethylene having a comonomer with a carbon number of 6 or more may be measured by gel permeation chromatography (GPC) under the following conditions:

column: Tosoh, HLC-8321 GPC/HT
solvent: TCB (Trichlorobenzene)+0.04% BHT (after drying with 0.1% $CaCl_2$))
flow velocity: 1.0 ml/min
sample concentration: 1.5 mg/ml
dose: 300 μl
column temperature: 160° C.
Detector: RI detector
Standard: Polystyrene (calibrated with a third-order function)

In an embodiment of the present disclosure, the crystallization temperature of the sealant resin and the crystallization temperature of the linear low-density polyethylene having a comonomer with a carbon number of 6 or more may be similar. For example, the difference between the crystallization temperature of the sealant resin and the crystallization temperature of the linear low-density polyethylene having a comonomer with a carbon number of 6 or more may be 10° C. or less, or 5° C. or less. In addition, the difference between the crystallization temperature of the sealant resin and the crystallization temperature of the linear low-density polyethylene having a comonomer with a carbon number of 6 or more may be 0.1° C. or more. If the difference between the crystallization temperature of the sealant resin and the crystallization temperature of the linear low-density polyethylene having a comonomer with a carbon number of 6 or more satisfies the above range, the sealant resin and the linear low-density polyethylene having a comonomer with a carbon number of 6 or more may have improved fusion characteristic during normal operation of the battery.

In an embodiment of the present disclosure, the linear low-density polyethylene having a comonomer with a carbon number of 6 or more may have a crystallization temperature of 90° C. to 115° C., or 95° C. to 110° C., or 100° C. to 110° C., or 105° C. to 110° C. If the crystallization temperature of the linear low-density polyethylene having a comonomer with a carbon number of 6 or more satisfies the above range, the sealant resin and the linear low-density polyethylene having a comonomer with a carbon number of 6 or more may have improved fusion characteristics.

In an embodiment of the present disclosure, the difference between the crystallization temperature of the sealant resin and the crystallization temperature of the linear low-density polyethylene having a comonomer with a carbon number of 6 or more may be 10° C. or less, and the crystallization temperature of the linear low-density polyethylene having a comonomer with a carbon number of 6 or more may be 90° C. to 115° C.

The crystallization temperature may be measured using a differential scanning calorimeter (DSC). For example, the temperature of the sample may be increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the crystallization temperature may be measured by maintaining the temperature at 280° C. for 10 minutes.

In an embodiment of the present disclosure, the resin having a higher melting point than the linear low-density polyethylene having a comonomer with a carbon number of 6 or more may have a melting point of higher than 120° C. to 140° C., or 130° C. to 140° C., or 132° C. to 138° C. If the melting point of the resin having a higher melting point than the linear low-density polyethylene having a comonomer with a carbon number of 6 or more satisfies the above-mentioned range, the rigidity of the vent member 15 may be improved more easily.

In an embodiment of the present disclosure, the resin having a melting point higher than the linear low-density polyethylene having a comonomer with a carbon number of 6 or more may include high-density polyethylene, random polypropylene, or a mixture thereof.

In an embodiment of the present disclosure, the vent member 15 may have various shapes so that the gas is easily directed toward the vent region. For example, the vent member 15 may have a film shape.

The vent member 15 may be formed to have a predetermined thickness of a preset magnitude.

In an embodiment of the present disclosure, as shown in FIGS. 1 and 2, the vent member 15 may be located in the sealing portion.

Referring to FIG. 2, the vent member 15 may be located in the sealing portion at a corner of the case. For example, the vent member 15 may be located at a corner of the sealing portion where the electrode lead 11 is exposed to the outside. Specifically, the vent member 15 may be located in the sealing portion next to the electrode lead 11, except for a region between the electrode leads 11. When the vent member 15 is located at the corner of the sealing portion where the electrode lead 11 is exposed to the outside, the amount of gas discharged toward the electrode lead 11 may be minimized, so that the safety of the battery may be further improved.

In an embodiment of the present disclosure, when the sealing portion **13*b* is sealed at three sides, the bent side of the case and one end of the vent member 15** may be in close contact.

In addition, the vent member 15 may be inserted into the case 13 so that the insertion length can be varied or the venting pressure and position can be controlled depending on the design. Here, the insertion length of the vent member 15 means a maximum value of the distance between one end and the other end of the vent member 15 based on the protruding direction of the electrode lead.

In an embodiment of the present disclosure, the insertion length of the vent member 15 may be smaller than the width of the sealing portion **13*b*. For example, the insertion length of the vent member 15 may be less than about 50% of the width of the sealing portion 13*b*. Here, the width of the sealing portion 13*b* means a maximum value of the distance between one end and the other end of the sealing portion 13*b* based on the protruding direction of the electrode lead 11**.

In another embodiment of the present disclosure, the insertion length of the vent member 15 may be greater than the width of the sealing portion **13*b*. For example, the vent member 15 may be inserted through the accommodation portion 13*a* to be exposed to the outside of the case 13**.

In an embodiment of the present disclosure, the vent member 15 may further include an adhesive layer for smoother placement.

Figure 4:
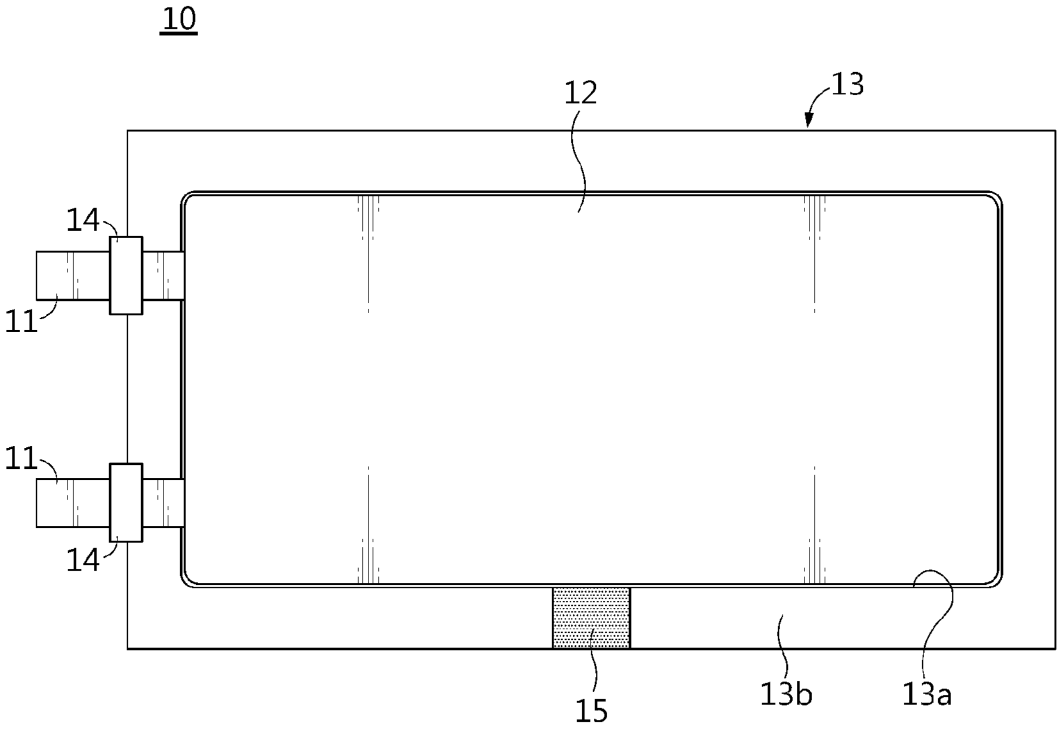
FIG. 4 is a plan view of the secondary battery according to another embodiment of the present disclosure.

FIG. 4 is a plan view of the secondary battery according to another embodiment of the present disclosure.

Referring to FIG. 4, the vent member 15 may be located in the sealing portion, except for the sealing portion where the electrode lead 11 is exposed to the outside.

Figure 5:
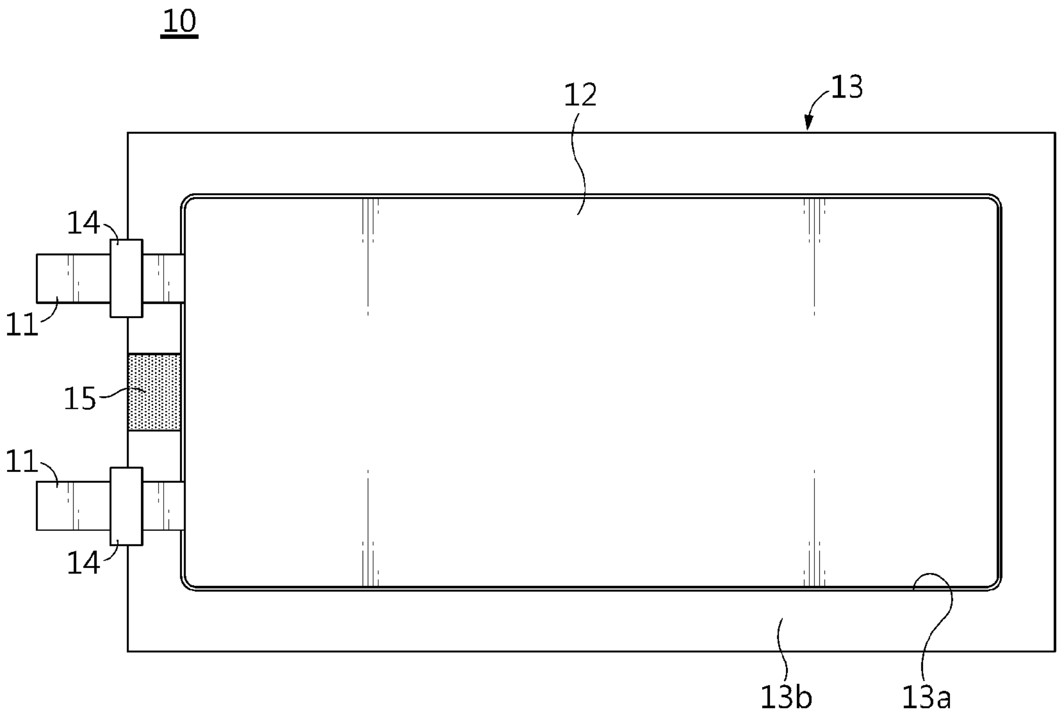
FIG. 5 is a plan view of the secondary battery according to still another embodiment of the present disclosure.

FIG. 5 is a plan view of the secondary battery according to still another embodiment of the present disclosure.

Referring to FIG. 5, the vent member 15 may be located in the sealing portion where the electrode lead 11 is exposed to the outside. For example, the vent member 15 may be positioned in the sealing portion between the electrode lead 11 and the electrode lead 11.

The secondary battery according to an embodiment of the present disclosure includes a vent member, which has a structure of three or more layers, contains a linear low-density polyethylene having a comonomer with a carbon number of 6 or more in the outermost layers, and contains a resin having a higher melting point than the linear low-density polyethylene having a comonomer with a carbon number of 6 or more in the middle layer, so it is possible to more smoothly and quickly implement directional venting that may discharge gas in a specific direction by lowering the sealing strength at high temperature. Therefore, when a thermal runaway phenomenon occurs, namely when internal temperature of the secondary battery rises, damage to the electrode caused by the gas may be minimized. In addition, the rigidity of the vent member is improved to prevent early venting prior to a desired temperature and pressure.

In an embodiment of the present disclosure, the secondary battery may be a cylindrical, prismatic, or pouch-type secondary battery. Among them, the secondary battery may be a pouch-type secondary battery.

Mode for Disclosure

Hereinafter, the present disclosure will be explained in more detail with reference to exemplary embodiments. This disclosure may, however, be embodied in many different forms and should not be construed as limited to the exemplary embodiments set forth therein. It will be apparent that these exemplary embodiments are provided so that the present disclosure will be complete and understood easily by those skilled in the art.

Example 1

A high-density polyethylene (Sabic®, HDPE F04660, melting point: 135° C., weight-average molecular weight: 350,000 g/mol, crystallization temperature: 119° C.) was inserted between linear low-density polyethylenes (ExxonMobile, Exceed™, 1018) (melting point: 119° C., comonomer content relative to the total resin content: 7.6 weight %, weight-average molecular weight: 289,053 g/mol, PDI: 3.023, crystallization temperature: 106° C.) having a comonomer with a carbon number of 6 and polymerized in the presence of a metallocene catalyst, and then thermally fused at 100° C., and then cut into 100 mm in width to prepare a vent member.

An upper pouch and a lower pouch in which poly(ethylene terephthalate)/aluminum foil/polypropylene resin were sequentially laminated were placed so that the polypropylene resins thereof face each other, and then were accommodated in an electrode assembly in which a positive electrode, a separator and a negative electrode were stacked in order.

After that, the prepared vent member was inserted between the polypropylene resins, and then thermally fused at conditions of 200° C. and 0.08 MPa for 1.5 seconds to prepare a secondary battery.

Comparative Example 1

An upper pouch and a lower pouch in which poly(ethylene terephthalate)/aluminum foil/polypropylene resin were sequentially laminated were placed so that the polypropylene resins thereof face each other, and then were accommodated in an electrode assembly in which a positive electrode, a separator and a negative electrode were stacked in order.

Then, the polypropylene resins were thermally fused to prepare a secondary battery.

Comparative Example 2

An upper pouch and a lower pouch in which poly(ethylene terephthalate)/aluminum foil/polypropylene resin were sequentially laminated were placed so that the polypropylene resins thereof face each other, and then were accommodated in an electrode assembly in which a positive electrode, a separator and a negative electrode were stacked in order.

After that, a vent member made of a linear low-density polyethylene (ExxonMobile, Exceed™, 1018) (melting point: 119° C., comonomer content relative to the total resin content: 7.6 weight %, weight-average molecular weight: 289,053 g/mol, PDI: 3.023, crystallization temperature: 106° C.) having a comonomer with a carbon number of 6 and polymerized in the presence of a metallocene catalyst was inserted between the polypropylene resins, and then thermally fused at conditions of 200° C. and 0.08 MPa for 1.5 seconds to prepare a secondary battery.

Evaluation Example 1: Measurement of a Sealing Strength According to Temperature In the secondary batteries prepared in Example 1 and Comparative Example 2, a part of the case in which the vent member was inserted was cut to 15 mm in width and 5 cm in length at the following temperature, then both ends of the cut sample were opened at 180° and bite using a UTM jig, and then a tensile test was performed at a rate of 5 mm/min. The sealing strength of the case at this time is shown in Table 1 below.

In the secondary battery prepared in Comparative Example 1, a part of the case corresponding to the sealing portion was cut to 15 mm in width and 5 cm in length at the following temperature, then both ends of the cut sample were at 180° and bite using a UTM jig, and then a tensile test was performed at a speed of 5 mm/min. The sealing strength of the case at this time is shown in Table 1 below.

At this time, the maximum sealing strength means a maximum value when the case is broken, and the average sealing strength means an average value when the case is stretched by 8 mm at 4.5 kgf/15 mm if the maximum sealing strength is 4.5 kgf/15 mm or more, and means an average value when the case is stretched by 8 mm at the maximum sealing strength if the maximum sealing strength is less than 4.5 kgf/15 mm.

TABLE 1

| | | Example 1 | | Comparative Example 1 | | Comparative Example 2 | |
|---|---|---|---|---|---|---|---|
| | | Max | Ave | Max | Ave | Max | Ave |
| Sealing strength (kgf/15 mm) | Room temp. (25° C.) | 15.5 | 10.6 | 13.9 | 9.7 | 11.1 | 9.4 |
| | 60° C. | 13.9 | 8.1 | 12.9 | 7.2 | 7.2 | 5.9 |
| | 100° C. | 2.5 | 2.0 | 9.6 | 6.2 | 1.7 | 1.6 |
| | 120° C. | 0.4 | 0.3 | 7.0 | 5.8 | 0.5 | 0.3 |

As can be seen in Table 1, it may be found that in the secondary battery prepared in Example 1, the maximum sealing strength and the average sealing strength of the part of the case in which the vent member is inserted at room temperature to 60° C. are higher than the maximum sealing strength and the average sealing strength of the part of the case in which the vent member is inserted in the secondary battery prepared in Comparative Example 2 at room temperature to 60° C. Accordingly, the rigidity of the vent member 15 is improved compared to the case where only the linear low-density polyethylene having a comonomer with a carbon number of 6 or more is included, thereby preventing early venting from occurring prior to a desired temperature and pressure.

In addition, it may be found that in the secondary battery prepared in Example 1, the maximum sealing strength and the average sealing strength of the case in which the vent member is inserted at 100° C. or above are similar to the maximum sealing strength and the average sealing strength of the part of the case in which the vent member is inserted in the secondary battery prepared in Comparative Example 1 at 100° C. or above. Accordingly, the secondary battery prepared in Example 1 may secure proper sealing strength when the battery is operating normally, and when the battery is heated to a high temperature due to an abnormal phenomenon, gas may be discharged through the vent member whose sealing strength is weakened.

Meanwhile, in the secondary battery prepared in Comparative Example 1, the maximum sealing strength and the average sealing strength of the case at room temperature to 60° C. are similar to the maximum sealing strength and the average sealing strength of the part of the case in which the vent member is inserted at room temperature to 60° C. in the secondary battery prepared in Example 1, but the maximum sealing strength and the average sealing strength at 100° C. or above are significantly higher than the maximum sealing strength and the average sealing strength of the part of the case in which the vent member is inserted at 100° C. or above in the secondary battery prepared in Example 1. Thus, when the battery is heated to high temperature due to an abnormal phenomenon, the gas may be discharged in an unspecified direction to cause a chain ignition of the battery.

What is claimed is:

1. A secondary battery, comprising:
an electrode assembly;
an electrode lead attached to the electrode assembly;
a case configured to accommodate the electrode assembly therein, the case having a multilayer structure including an outer layer, a metal barrier layer, and an inner sealant resin layer;
a lead film formed to surround a part of an outer surface of the electrode lead and interposed between the electrode lead and the case;
a vent region formed in at least a part of the case; and
a vent member inserted into the vent region and having a structure of three or more layers, the vent member located within opposing surfaces of the inner sealant resin layer of the case,
wherein the vent member contains outermost layers including a linear low-density polyethylene having a comonomer with a carbon number of 6 or more and contains a middle resin layer having a higher melting point than the outermost layers and located between the outermost layers.

2. The secondary battery according to claim 1,
wherein a vent occurs between the case and the outermost layer.

3. The secondary battery according to claim 1,
wherein the resin having a higher melting point than the linear low-density polyethylene having a comonomer with a carbon number of 6 or more has a melting point between 120° C. and 140° C.

4. The secondary battery according to claim 1,
wherein the linear low-density polyethylene having a comonomer with a carbon number of 6 or more has a melting point of between 100° C. and 120° C.

5. The secondary battery according to claim 1,
wherein the resin having a higher melting point than the linear low-density polyethylene having a comonomer with a carbon number of 6 or more includes a high-density polyethylene, random polypropylene, or a mixture thereof.

6. The secondary battery according to claim 1,
wherein the case includes a sealing portion formed to seal the electrode assembly,
the sealing portion contains a sealant resin, and
the linear low-density polyethylene of the vent member having a comonomer with a carbon number of 6 or more has a lower melting point than the sealant resin.

7. The secondary battery according to claim 1,
wherein the outermost layers contain a linear low-density polyethylene having a comonomer with a carbon number of 6 to 8.

8. The secondary battery according to claim 1,
wherein the vent member melts at 100° C. to 120° C. to vent a gas, or wherein the vent member is vented at a pressure of about 1.5 atm or above.

9. The secondary battery according to claim 1,
wherein the vent member has a maximum sealing strength of less than 6 kgf/15 mm at 100° C. or above.

10. The secondary battery according to claim 1,
wherein the vent member has an average sealing strength of less than 4.5 kgf/15 mm at 100° C. or above.

11. The secondary battery according to claim 1,
wherein the vent member has a maximum sealing strength of 6 kgf/15 mm or more at room temperature to 60° C.

12. The secondary battery according to claim 1,
wherein the vent member has an average sealing strength of 4.5 kgf/15 mm or more at room temperature to 60° C.

13. The secondary battery according to claim 1,
wherein the linear low-density polyethylene having a comonomer with a carbon number of 6 or more is polymerized in the presence of a metallocene catalyst.

14. The secondary battery according to claim 1,
wherein in the linear low-density polyethylene having a comonomer with a carbon number of 6 or more, a content of the comonomer with a carbon number of 6 or more is 15 weight % or less, based on 100 weight % of the linear low-density polyethylene having a comonomer with a carbon number of 6 or more.

15. The secondary battery according to claim 1,
wherein the linear low-density polyethylene having a comonomer with a carbon number of 6 or more has a poly dispersity index (PDI) of 4 or less.

16. The secondary battery according to claim 6,
wherein a difference between a crystallization temperature of the sealant resin and a crystallization temperature of the linear low-density polyethylene having a comonomer with a carbon number of 6 or more is 10° C. or less.

17. The secondary battery according to claim 16, wherein the linear low-density polyethylene having a comonomer with a carbon number of 6 or more has a crystallization temperature of 90° C. to 115° C.

18. The secondary battery according to claim 1, wherein the linear low-density polyethylene having a comonomer with a carbon number of 6 or more has a weight-average molecular weight of 100,000 g/mol to 400,000 g/mol.

19. The secondary battery according to claim 6, wherein the vent region is located in the sealing portion at a corner of the case.

20. The secondary battery according to claim 1, wherein the secondary battery is a pouch-type secondary battery.

* * * * *